United States Patent [19]

Marzullo

[11] Patent Number: 5,645,371
[45] Date of Patent: Jul. 8, 1997

[54] BULKHEAD SYSTEM

[76] Inventor: Raffaele Marzullo, 407 Pulaski Rd., Greenlawn, N.Y. 11740

[21] Appl. No.: 552,541

[22] Filed: Nov. 3, 1995

[51] Int. Cl.⁶ .................................................. E02B 3/06
[52] U.S. Cl. .................. 405/33; 405/21; 405/30; 405/15; 52/DIG. 9
[58] Field of Search .................. 405/15–21, 29–35, 405/284; 47/DIG. 13; 52/DIG. 9

[56] References Cited

U.S. PATENT DOCUMENTS

| | | | |
|---|---|---|---|
| 3,951,384 | 4/1976 | Hildreth | 52/DIG. 9 |
| 4,468,151 | 8/1984 | Warlick | 405/31 X |
| 4,767,240 | 8/1988 | Ohkawara . | |
| 4,997,309 | 3/1991 | Kiselewski | 405/21 X |
| 5,024,560 | 6/1991 | Reilly | 405/16 X |
| 5,087,150 | 2/1992 | McCreary | 405/16 X |
| 5,141,359 | 8/1992 | Klockner . | |
| 5,172,528 | 12/1992 | Clarke | 52/DIG. 9 |
| 5,178,489 | 1/1993 | Suhayda | 405/21 |
| 5,316,815 | 5/1994 | Tripp | 52/DIG. 9 |
| 5,378,088 | 1/1995 | Foehrkolb | 405/21 X |

FOREIGN PATENT DOCUMENTS

| | | | |
|---|---|---|---|
| 372443 | 10/1983 | Austria | 47/DIG. 13 |
| 3729218 | 3/1989 | Germany | 47/DIG. 13 |

*Primary Examiner*—Dennis L. Taylor
*Attorney, Agent, or Firm*—Kenneth P. Robinson

[57] ABSTRACT

A bulkhead system to resist waterfront wave forces and reduce or eliminate erosion damage to waterfront property and structures. The bulkhead system is comprised of one or more rows of spaced nominally vertical piles, the piles extending into and above a ground surface in a self-supporting configuration. A stack of annular units, each in the form of a vehicle tire filled with concrete or other ballast material, is positioned on each of a plurality of the piles. Adjacent piles are positioned to have a pile-to-pile spacing to accommodate adjacent stacks of annular units and to form a substantially continuous wall or bulkhead. Intercoupling means, such as cabling, is also provided to couple adjacent groupings of piles so that wave forces incident on one or more piles are distributed to other piles on a shared basis.

20 Claims, 5 Drawing Sheets

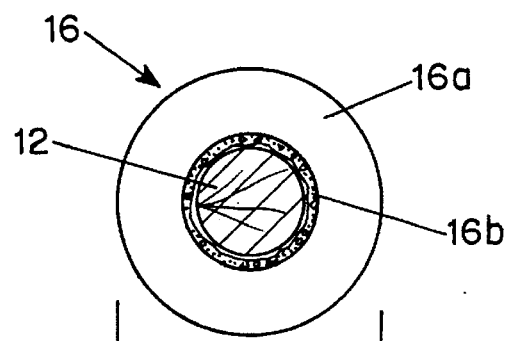
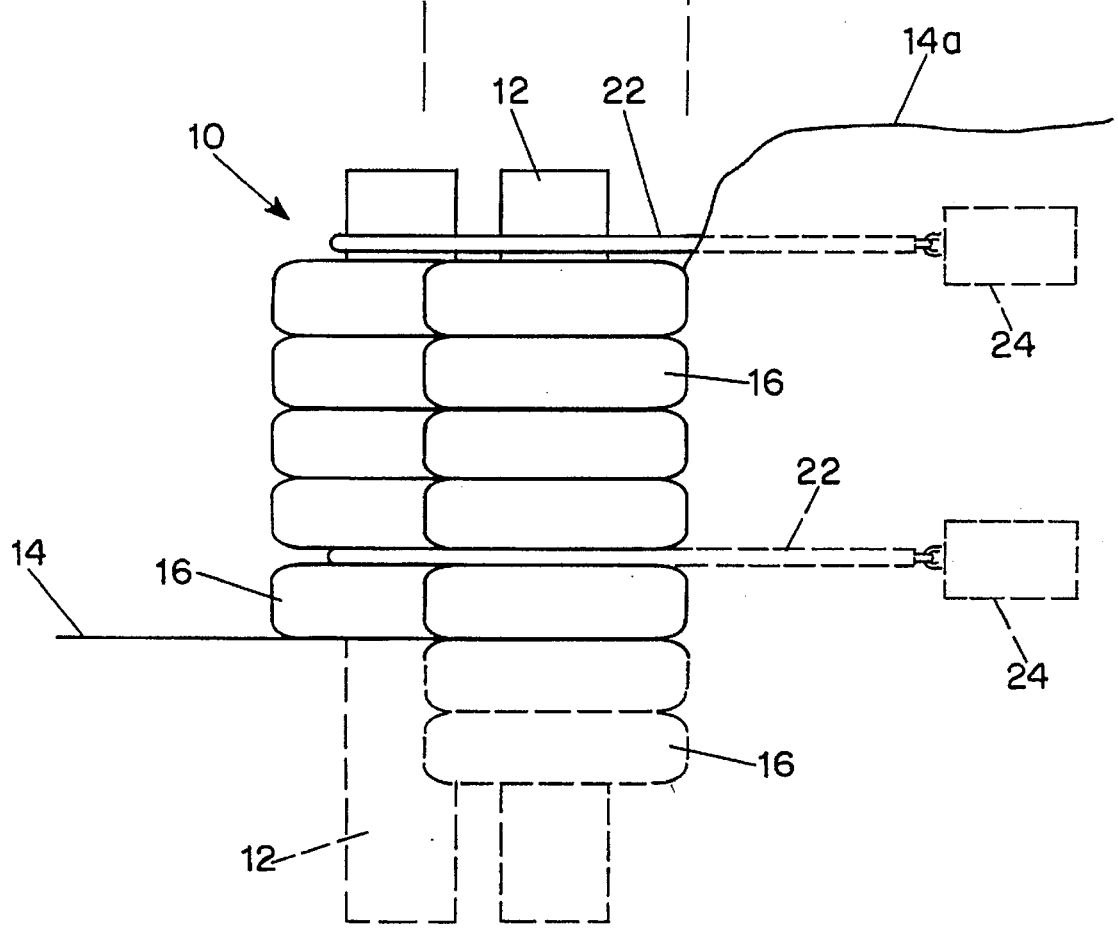
FIG. 1B
FIG. 1A

BULKHEAD SYSTEM

This invention relates to erosion control systems and more particularly to a bulkhead system for use at beachfront locations.

BACKGROUND OF THE INVENTION

The erosion of beachfront property is a continuing problem which has been studied and surveyed for many years. The problem relates to beaches, man-made and natural channels, and other waterfront locations. The primary cause of erosion is fluid forces active in the region where water meets land, as at the beachfront. Exacerbating factors are the movement of higher velocity currents associated with waves, tides, storm surges and in some instances boat wakes.

A variety of revetment systems have been proposed to slow or prevent the loss of sand and earthen materials that occurs with erosion at beachfront locations. One such system that has been used on a limited scale utilizes large concrete wall assemblies. These structures, which are costly to construct, have been employed to protect small sections of beachfront. However, providing an adequate foundation for large concrete walls is difficult, and the catastrophic failure of these structures can result under the force of a major storm and the associated wave forces. Concrete walls are also susceptible over time to cracking, chipping, and erosion from wind, sand and water.

Other systems are known that utilize a layer of interlocking concrete tiles. This type of system forms a lining or mat of erosion controlling material which is intimately in contact with the underlying ground material. Due to the tendency of the concrete tiles or sections to lift when subjected to high velocity water flows and heavy wave forces, these systems are generally more appropriate for river and canal banks where the forces incident on the tiles are limited.

Durable materials used in traditional erosion control systems include marine wood, aluminum, and large stones known as rip-rap. Steel has also been employed but is typically susceptible to rust and quick deterioration. A number of traditional pier type constructions, made primarily of wood materials are also well known, but have generally been limited to structures in protected areas such as harbors and marinas.

A preferred material for the construction of traditional bulkheads, docks and marinas is marine pine. When not exposed to sun light and the damage caused by ultra violet (UV) light, this wood essentially resists deterioration over periods of hundreds of years, and may actually harden over time.

One capability not achievable in many of the revetment systems previously proposed is the ability of the structure to yield slightly and recover when subjected to forces of the kind encountered in beachfront areas. This capability is especially important during storms and heavy surf conditions. Fixed and very rigid structures, like those constructed with concrete slabs, may catastrophically fail under extreme conditions due to their rigidity. It is therefore desirable to provide a fixed, yet somewhat flexible, very tough structure for the construction of bulkhead walls and revetments.

A long known and constantly worsening problem, which is seemingly unrelated to beachfront property erosion, relates to the disposal of used vehicle tires. Composed of compositions comprising rubber, nylon and steel materials, used and worn tires are very resistant to natural decay and are virtually unaffected by sand, salt water, and UV light. The dilemma of how to dispose of used and worn tires has also been studied without satisfactory solution for many years. While beachfront use of tires has been proposed in some applications, no fully satisfactory erosion control solution has resulted. It would therefore be highly desirable to provide an environmentally safe way to recycle discarded vehicle tires, while at the same time providing an improved level of erosion control.

As the building of homes and other structures at the waters edge continues, there is a need for new and improved methods to construct revetment and bulkhead systems to slow or prevent the erosion of valuable beachfront real estate and the structures constructed thereon. Objects of the present invention are, therefore, to provide a new and improved bulkhead system having one or more of the following capabilities and features:

a simple method of construction with a resulting structure foundationally fixed and capable of absorbing wave and water forces typically found at beachfront areas;

environmentally safe recycling of used vehicle tires;

a high integrity bulkhead system with low materials and production cost when compared to alternative systems;

a very durable and long lasting structure, resistant to the effects of wind, weather, sunlight and salt or fresh water; and moderate cost due to the use of materials which are readily available, recyclable, or both.

SUMMARY OF THE INVENTION

In accordance with the invention, a bulkhead system is disclosed to be used to resist beachfront wave forces. The bulkhead system is comprised of a first row of spaced nominally vertical piles, each of a plurality of the piles extending into and above a ground surface in a self-supporting configuration. A second row of spaced nominally vertical piles is positioned adjacent to the first row, each of a plurality of the piles of the second row extending into and above a ground surface in a similar self-supporting configuration. The second row of piles may be longitudinally staggered with respect to the piles of the first row. A stack of annular units is positioned on each of a plurality of the piles of the first row and the second row. Each annular unit is in the form of a vehicle tire containing a ballast material. Adjacent piles of the first and second rows are positioned to have a pile-to-pile spacing to accommodate the adjacent stacks of the annular units in a nominally periphery-to-periphery configuration. An intercoupling means, such as cabling, is provided to couple selected piles of the first and second rows, for structurally intercoupling the piles to distribute wave forces incident on one pile to other piles on a shared basis.

For a better understanding of the invention, together with other and further objects, reference is made to the accompanying drawings, with the scope of the invention pointed out in the appended claims.

BRIEF DESCRIPTION OF THE DRAWINGS

In the drawings, like elements are assigned like reference numerals. The drawings are briefly described as follows.

FIG. 1A illustrates an end view of an embodiment of the bulkhead system in accordance with the invention.

FIG. 1B provides a plan view of an embodiment of an annular unit used with the preferred embodiment of the invention.

DETAILED DESCRIPTION OF THE INVENTION

Figure 1C:
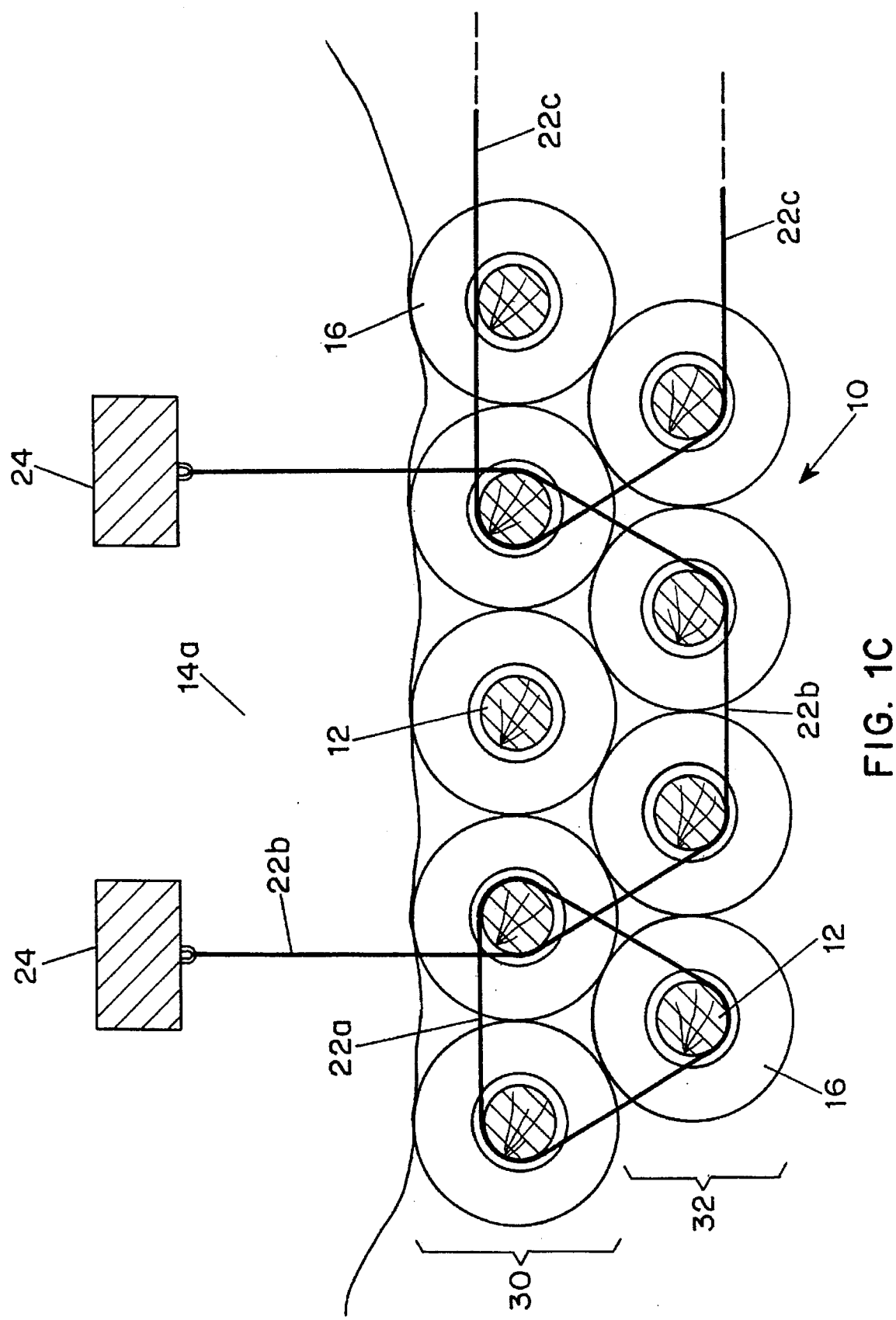
FIG. 1C depicts a plan view of the bulkhead system illustrated in FIG. 1A.

Referring now to FIG. 1A, there is illustrated in accordance with the present invention, an end view of an embodiment of the bulkhead system 10. Shown are piles 12 extending into and above a ground surface 14. As illustrated, the bulkhead system is positioned immediately in front of an earthen bank 14a. It should be understood that the ground surface 14 may be above or below water level. The piles 12 are positioned in a nominally vertical orientation, wherein nominally vertical can be defined to be within 30 degrees of a true vertical position. The true vertical line may be determined by a device such as a plumbob or the equivalent. In some locations it may be desirable to slope the piles back from incident wave forces, or forward toward the incident wave forces. Piles 12 may be formed of marine pine or other suitable material.

A stack of annular units 16, one of which is shown in a plan view in FIG. 1B, is positioned on each of the piles 12. The annular units 16 are comprised of vehicle tires 16a that contain a ballast material 16b. The vehicle tires 16a may be used or manufacturer rejected tires. Ballast material 16b, which annularly fills the vehicle tires leaving the center open to accommodate the diameter of the pile, is included to weigh down the vehicle tire, as well as provide increased structural rigidity. Suitable ballast materials include concrete, gravel and stones. As a result of the inclusion of a ballast material within the tire, the annular units occupy a somewhat fixed volume when stacked one on top of the other and do not have a tendency to float. In addition, ballast material 16b will also prevent annular unit 16 from possibly compressing or partially collapsing when subjected to wave forces incident to the bulkhead system 10. The ballast filled tires provide a combination of structural integrity with a degree of flexibility which results in a very strong, but not absolutely rigid, structure. Structural configurations utilizing piles 12 and the associated stacks of annular units 16 will be discussed further.

Also illustrated in FIG. 1A is an embodiment of an intercoupling means 22 comprised of cables. The intercoupling means 22 is provided to intercouple at least selected piles 12 to distribute wave forces incident on one or more piles to other piles on a shared basis. As a result of the inclusion of intercoupling means 22, the load of the wave forces can be absorbed in a distributed manner by a plurality of piles 12. Anchor units 24 buried within bank 14a may be provided to secure the bulkhead system 10 firmly to the bank being protected from wave forces. As shown in FIG. 1A, the anchor units 24 are depicted as blocks, and may be constructed of concrete or wood. Alternatively, anchor units 24 may be realized by one or more annular units 16 embedded in the earthen material of bank 14a behind bulkhead system 10.

Referring now to FIG. 1C, there is provided a plan view of the bulkhead system illustrated in FIG. 1A, which may be a portion of a more extensive bulkhead system extending along a beach. As shown the bulkhead can be formed using a first row 30 of spaced of piles 12, along with a second row 32 of spaced piles. The stacks of annular units 16 of first row 30 are shown abutting the bank of earthen material. Interconnecting cables 22a, 22b and 22c, provide a partial view of intercoupling means 22 of FIG. 1A. The intercoupling cable 22a provides an example of the intercoupling of a selected grouping of piles 12 consisting of three adjacent piles. Cable 22b provides an example of the intercoupling of a selected grouping of piles 12 that are coupled directly to the bank of earthen material 14a behind the bulkhead. Cable 22b is anchored by anchoring units 24. As shown, anchoring units 24 are in near proximity to the bulkhead. It should be noted that it is contemplated that anchor units 24 could preferably be placed at a substantial distance from the bulkhead for more secure placement. Similarly, the anchor units may be embedded in the bank of earthen material 14a at a depth so that cable 22b is not normal to the bulkhead wall 10 as illustrated, but moves downward or off at an angle as the cable 22b extends away from the bulkhead. Cable 22c provides an example of the intercoupling of a selected grouping of piles 12 that consists of more that three piles, and is not coupled to the bank of earthen material. Cables 22a, 22b and 22c provide just a few examples of how the intercoupling means 22 may be provided using cables or other suitable structural elements. It should be noted that an entire bulkhead could be configured with groupings consisting of only one of these types of structural intercouplings, or any combination of these and other possible groupings and intercouplings.

The bulkhead system 10 embodiment in FIGS. 1A and 1C places the piles of the second row 32 in a longitudinally staggered relation to the piles 12 of first row 30. The term longitudinally staggered is used to indicate that when viewed normal to the piles of the first row 30, the piles of second row 32 appear to be positioned in the spaces between the piles 12 of the first row 30, and not directly behind the piles of the first row. In other embodiments the bulkhead system 10 of the present invention may comprise two or more rows of piles that are aligned and not longitudinally staggered. With piles 12 in an aligned arrangement (as will be discussed with reference to FIG. 2C), the piles are termed longitudinally aligned. Further, it is contemplated that a bulkhead system may be configured with a single row of piles 12 and associated annular units 16. A single row configuration is particularly useful in river bank installations not subject to severe wave forces.

Turning again to FIG. 1C, it can be noted that adjacent piles 12 are positioned to have a pile-to-pile spacing to accommodate adjacent stacks of annular units 16 in a nominally periphery-to-periphery configuration. However, due to size and diameter variations which are possible from one annular unit 16 to the next annular unit, some gaps and spaces may exist between adjacent stacks of annular units. For present purposes, a "nominally periphery-to-periphery configuration" as an arrangement with the periphery of one stack of annular units 16 six inches or less from the periphery of an adjacent stack. As presently contemplated, the preferred embodiment of the bulkhead system includes stacks of annular units 16 wherein each stack is in actual contact with all adjacent stacks of annular units, as illustrated.

Figures 2A, 2B:
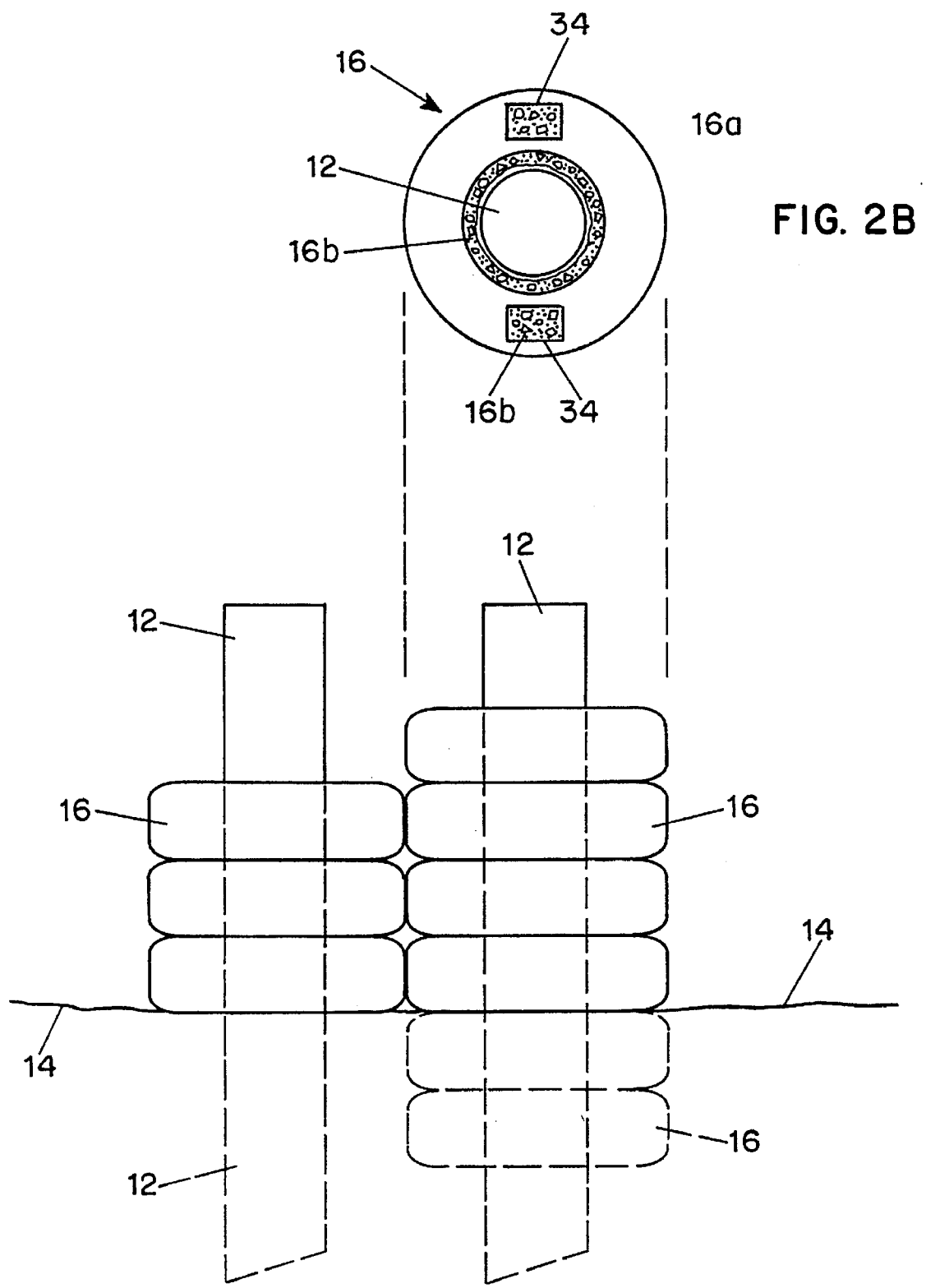
FIG. 2A shows the end view of another embodiment of the bulkhead system.
FIG. 2B is a plan view of another embodiment of an annular unit that may be used with the invention.
Figure 2C:
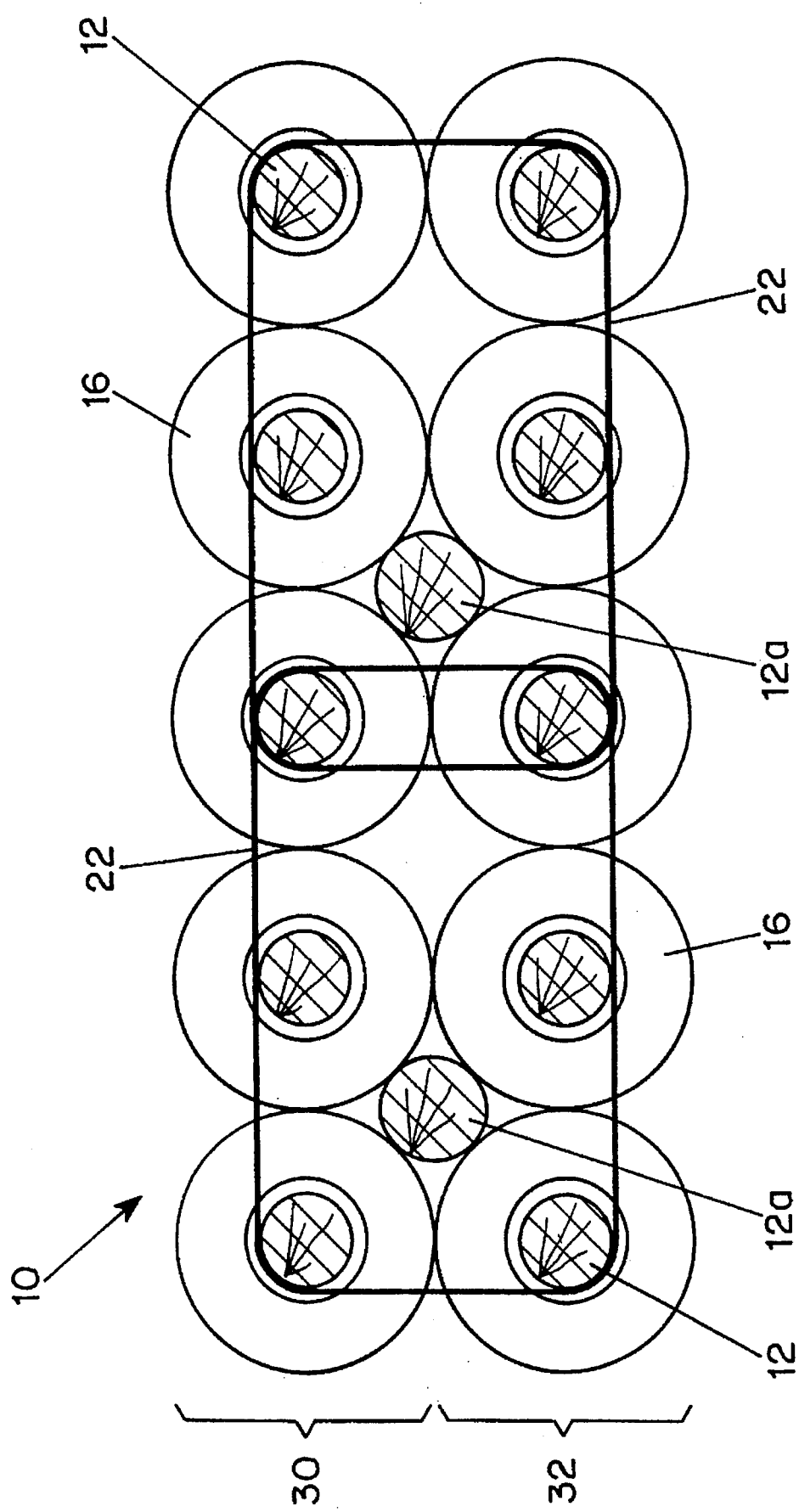
FIG. 2C provides a plan view of a portion of the bulkhead system illustrated in FIG. 2A.

Referring now to FIG. 2A there is illustrated the end view of another embodiment of bulkhead system 10. The construction of this embodiment is similar to that of the embodiment of FIGS. 1A and 1C, with the exception that the piles of this embodiment are positioned so as to be longitudinally aligned, and not longitudinally staggered. FIG. 2C provides a top view of the bulkhead 10 of this embodiment and clearly shows the piles in a longitudinally aligned configuration. An additional feature possible with the aligned pile embodiment, is the inclusion of piles, such as pile 12a, which may be positioned in the spaces formed by the periphery of adjacent stacks of annular units. Piles 12a are not to be confused with the piles 12 positioned concentrically within the stacks of annular units 16. Piles 12a may be included to provide additional foundational and structural support to the bulkhead system 10. Since these piles do not directly support a stack of annular units 16, they may be provided with an overall length greater than or less than the overall height of piles 12 used to support the stacks of annular units 16. Also shown in this arrangement is intercoupling means, shown as cables 22, wherein groupings of intercoupled piles 12 are formed by six adjacent piles, including three piles 12 from the first row 30 and three from the second row 32. It should be noted that the intercoupling methods previously discussed and applied to the embodiment of FIG. 1A and FIG. 1B, apply fully to this embodiment as well.

Turning to FIG. 2B, there is illustrated a plan view of another embodiment of annular unit 16. In this embodiment, one or more access openings 34 are provided in the side wall of the tire 16a. Access opening 34 may be included to allow annular units 16 that are comprised of vehicle tires 16a to be more readily filled with a suitable ballast material 16b, such as concrete, gravel, or stones. In the presently preferred embodiment, the annular units 16 are pre-filled with concrete, which is permitted to harden before units 16 are positioned on a pile 12. Many variations will become apparent to skilled persons. Tires may be filled off site or on site and different ballast material may be used with annular units that are below water level (at the time of construction) versus those above ground level. It should also be noted that access opening 34 may be larger or smaller than depicted in FIG. 2B, depending on the materials and filling processes used.

Another aspect of the present invention, as illustrated in FIGS. 1B and 2B is the placement of annular units below a ground surface 14. In this configuration, wherein one or more annular units 16 are positioned below ground level, additional foundational support for piles 12 is provided. The selection of piles with annular units 16 below the ground surface 14 can be such that all piles are configured this way, or some or all of the piles of just the second row 32 include below ground units. Many configurations combining piles with annular units above and below ground surface 14 may be employed by skilled persons in application of the present invention.

Figure 3:
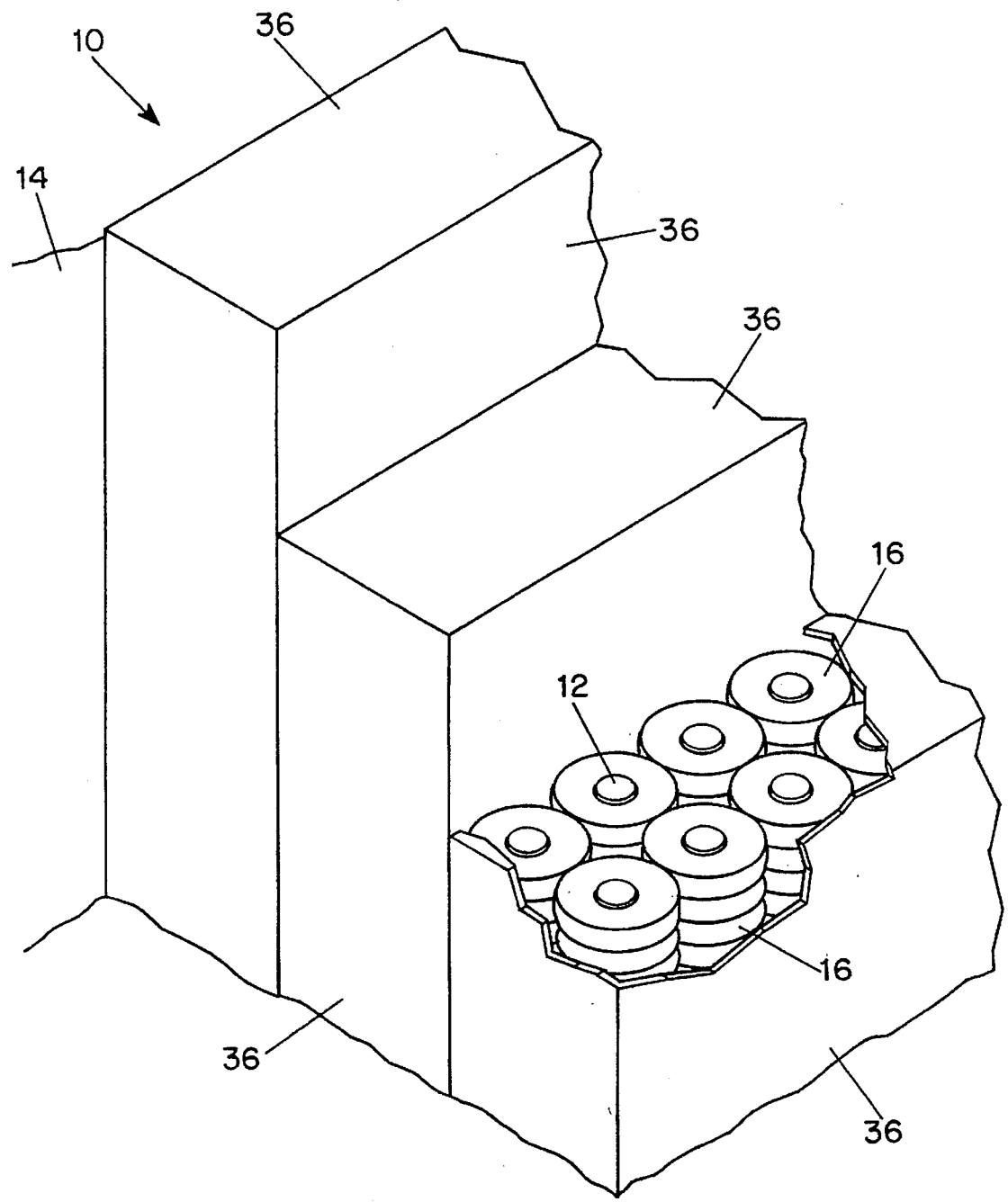
FIG. 3 is a perspective view of an embodiment of a multi-section bulkhead system having a covering, the covering shown partially cut away.

Turning now to FIG. 3 there is shown a perspective view of an embodiment of a multi-section bulkhead system having a covering 36. As depicted a portion of the covering 36 is partially cut-away to show a section of the underlying bulkhead. The bulkhead shown in FIG. 3 can be comprised bulkhead walls of one or more rows of piles 12, either longitudinally staggered or aligned, as previously described. Covering 36 is included to aesthetically enhance and dress exposed portions of piles 12 and the periphery surface of annular units 16, and may also contribute to the overall structural strength and integrity of the bulkhead system. Water and salt resistant materials, such as wood planks, can be used to provide covering 36. Skilled persons can employ various methods to fix covering 36 to piles 12 and/or annular units 16. As an example, if piles 12 are provided as wooden piles of marine pine, spikes may be driven between stacked annular units 16 and into piles 12 to fasten the covering 36 to the bulkhead. Similarly, lag bolts, which are sometimes used in the construction of traditional bulkhead walls and docks may be used.

It should be noted that although the best mode embodiment contemplated would utilize piles comprised of wood, with marine pine being the currently preferred wood, other materials such as reinforced concrete, or rust resistant steel may also be used. Further, although embodiments of the bulkhead system 10 presented have been illustrated as being positioned adjacent to a bank of earthen material, this need not always be the case. Since piles 12 of FIGS. 1a and 2a extend below a ground surface in a self-supporting configuration, the bulkhead system 10 can be utilized as a sea wall or jetty. In such applications, the bulkhead system 10 may be positioned so as to extend outward from such a bank into a body of water, or be positioned to be free-standing within a body of water.

As discussed, the invention makes possible the beneficial recycling of used rubber vehicle tires in large numbers. In some locations, large quantities of used elevator or other steel cables are also available and with suitable steps to provide corrosion resistance, can be usefully recycled in application of the invention. Both cost savings and desirable recycling benefits can be accomplished in application of the invention.

While there have been described the currently preferred embodiments of the present invention, those skilled in the art will recognize that other and further modifications may be made without departing from the invention and it is intended to claim all modifications and variations as fall within the scope of the invention.

What is claimed is:

1. A bulkhead system to resist waterfront wave forces, comprising:
    a first row of spaced nominally vertical piles, each of a plurality of said piles extending into and above a ground surface in a self-supporting configuration;
    a second row of spaced nominally vertical piles, each of a plurality of said piles extending into and above the ground surface in a self-supporting configuration, said second row positioned in a longitudinally staggered relationship to said first row;
    a stack of annular units positioned on each of a plurality of piles of said first and second rows, each said annular unit comprised of a vehicle tire containing a ballast material;
    adjacent piles of said first and second rows positioned to have a pile-to-pile spacing to accommodate adjacent stacks of said annular units in a nominally periphery-to-periphery configuration; and
    intercoupling means, coupled to at least selected piles of said first and second rows, for structurally intercoupling said piles to distribute wave forces incident on one pile to other piles on a shared basis.

2. A bulkhead system as in claim 1, wherein said ballast material is selected from a group of ballast materials consisting of concrete, stones, or gravel.

3. A bulkhead system as in claim 1, wherein each said annular unit comprises a vehicle tire containing a concrete filling around a central opening suitable to encompass one of said piles.

4. A bulkhead system as in claim 3, wherein said vehicle tire of each annular unit includes at least one sidewall access opening enabling placement of said concrete filling within said vehicle tire prior to hardening of said concrete filling.

5. A bulkhead system as in claim 1, wherein at least one said annular unit is positioned on a pile at a level below the ground surface.

6. A bulkhead system as in claim 1, wherein said intercoupling means includes at least one cable extending at least partially around a grouping of said piles, said grouping comprised of piles from said first and second rows.

7. A bulkhead system as in claim 1, wherein said intercoupling means further includes at least one cable fixed to a spaced anchor unit, said anchor unit embedded within earthen material.

8. A bulkhead system as in claim 1, wherein said vehicle tires include at least one of: used automotive tires; used truck tires, used airplane tires.

9. A bulkhead system as in claim 1, further including a covering constructed of wood planks, said covering provided to aesthetically dress exposed portions of said piles and said annular units.

10. A bulkhead system to resist waterfront wave forces, comprising:

a row of spaced nominally vertical piles, each of a plurality of said piles extending into and above a ground surface in a self-supporting configuration; and a stack of annular units positioned on each of a plurality of piles of said row, each said annular unit comprised of a vehicle tire containing a ballast material;

adjacent piles of said row of piles positioned to have a pile-to-pile spacing to accommodate adjacent stacks of said annular units in a nominally periphery-to-periphery configuration.

11. A bulkhead system as in claim 10, wherein said ballast material is selected from a group of ballast materials consisting of concrete, stones, or gravel.

12. A bulkhead system as in claim 10, wherein each said annular unit comprises a vehicle tire containing a concrete filling around a central opening suitable to encompass one of said piles.

13. A bulkhead system as in claim 12, wherein said vehicle tire of each annular unit includes at least one sidewall access opening enabling placement of said concrete filling within said vehicle tire prior to hardening of the concrete filling.

14. A bulkhead system as in claim 10, wherein at least one said annular unit is positioned on a pile at a level below the ground surface.

15. A bulkhead system as in claim 10, further comprising intercoupling means, coupled to at least selected piles of said row of piles to structurally intercoupling said piles, to distribute wave forces incident on one pile to other piles on a shared basis.

16. A bulkhead system as in claim 15, wherein said intercoupling means includes at least one cable extending at least partially around a plurality of said piles.

17. A bulkhead system to resist waterfront wave forces, comprising:

a first row of spaced nominally vertical piles, each of a plurality of said piles extending into and above a ground surface in a self-supporting configuration;

a second row of spaced nominally vertical piles, each of a plurality of said piles extending into and above a ground surface in a self-supporting configuration, said second row positioned nominally parallel to said first row; and a stack of annular units positioned on each of a plurality of piles of said first and second rows, each said annular unit comprised of a vehicle tire containing a ballast material;

adjacent piles of said first and second rows positioned to have a pile-to-pile spacing to accommodate adjacent stacks of said annular units in a nominally periphery-to-periphery configuration.

18. A bulkhead system as in claim 10, further comprising intercoupling means, said intercoupling means including at least one cable extending at least partially around a grouping of piles from said first and second rows to structurally intercoupling said piles to distribute wave forces incident on one pile to other piles on a shared basis.

19. A bulkhead system as in claim 17, wherein at least one said annular unit is positioned on a pile at a level below said ground surface.

20. A bulkhead system as in claim 17, wherein said ballast material is selected from a group of ballast materials consisting of concrete, stones, or gravel, and each said vehicle tire includes at least one sidewall opening for placement of said ballast material.

* * * * *